Patented Sept. 21, 1948

2,449,643

UNITED STATES PATENT OFFICE 2,449,643

BENZONITRILE PRODUCTION FROM BENZENE OR DIPHENYL AND HCN

John N. Cosby, Morristown, N. J., assignor to Allied Chemical & Dye Corporation, New York, N. Y., a corporation of New York No Drawing. Application April 26, 1946, Serial No. 665,339

6 Claims. (Cl. 260—465)

1

This invention is directed to a process for the production of benzonitrile by reaction of benzene and hydrocyanic acid.

Procedures heretofore proposed for the production of benzonitrile have involved its formation from compounds such as aniline, benzoic acid or substituted benzene compounds such as the halides and sulfonate salts. It is an objective of the process of this invention to provide a method whereby benzonitrile may be produced from benzene by reaction with hydrocyanic acid.

I have discovered that if vapors of benzene mixed with hydrocyanic acid gas are heated to high temperatures they react to form benzonitrile. Diphenyl, which is a combination of two benzene nuclei and, as is well known, is formed when benzene vapors are heated to high temperatures, also reacts with hydrocyanic acid to form benzonitrile similarly to the reaction of benzene. That a similar reaction takes place whether the initial reaction mixture contains benzene or diphenyl and hydrocyanic acid may be explained on the basis that at the high temperatures employed in carrying out the reaction to which this invention is directed there appears to be an equilibrium between benzene reacting to form diphenyl and hydrogen and diphenyl and hydrogen reacting to form benzene. This equilibrium reaction has been explained on the basis that both benzene and diphenyl form free phenyl radicals which may then combine with themselves or with hydrogen present to form, respectively, diphenyl and benzene. The formation of free phenyl radicals from benzene or diphenyl and the reaction of the free radicals with hydrocyanic acid to form benzonitrile and hydrogen appears to be involved in the production of benzonitrile by the process of this invention. Accordingly, diphenyl is to be regarded as the equivalent of benzene as a starting material for the production of benzonitrile by the process of this invention.

In carrying out the process of this invention, a mixture of benzene or diphenyl vapors and hydrocyanic acid gas is heated to high temperatures, about 500° C. or higher, at which they react to form benzonitrile. The temperatures at which the vapor mixture undergoes this reaction forming benzonitrile extend over the broad range of about 500° upwardly to 1000° C. and higher. Excessively high temperatures, however, should not be used since at temperatures above 1100° C. benzene is lost by decomposition to form carbon. The reaction of the benzene or diphenyl and hydrocyanic acid may be carried out either in the presence or absence of catalysts. It has been

2 found that no special provision need be made for catalyzing the reaction. The reaction goes with adequate speed and with the formation of the desired benzonitrile merely by heating the materials in containers suitably refractory at the high temperatures to which the reacting materials are heated and resistant to corrosion at these temperatures. In the absence of catalysts the reaction proceeds at adequate rates at temperatures above 750° C. although it is preferred to heat the reactants at temperatures of about 900° C. to about 950° C. In this preferred range the reaction takes place rapidly with good conversion to benzonitrile. In the presence of catalysts lower temperatures may be employed. Substantially atmospheric pressures may be maintained on the reactants or if desired the pressures may be materially reduced below atmospheric or raised above atmospheric without preventing the desired reactions taking place. Diluent gases may also be present in the reactants.

The time during which the reaction mixture is heated at reaction temperatures may vary widely. The preferred reaction times will vary with the temperatures to which the materials are heated. In general, it is preferred to heat the gases for a period such that about 10% to about 60% of the benzene or diphenyl is attacked; i. e., about 90% to about 40% of the benzene or diphenyl in the inlet reaction mixture is present as benzene or diphenyl in the gases leaving the high temperature reaction zone.

It is preferred to employ an excess of hydrocyanic acid over that required for reaction with the benzene or diphenyl present to form benzonitrile. Thus, it is preferred to heat a reaction mixture which initially contains from 1.5 to 5 mols of HCN for every 1 mol of benzene or its equivalent one-half mol of diphenyl. A lower or higher ratio can be used, however, for example from 1 to 10 mols HCN for every 1 mol of benzene. With high ratios there is a tendency for the hydrocyanic acid to react to form carbon and low ratios tend to give low yields of benzonitrile and increase the amounts of by-products formed. Accordingly, it is best to keep within the foregoing ratios of hydrocyanic acid to benzene or diphenyl to avoid these disadvantages.

The invention will be more particularly described in connection with the treatment of the preferred starting materials, benzene vapors mixed with hydrocyanic acid gas.

The following examples are illustrative of this invention:

*Example 1.*—Benzene is vaporized and the vapors are mixed with gaseous hydrocyanic acid in the ratio of 2.2 mols HCN for every 1 mol benzene. This gas vapor mixture is continuously passed through an externally heated "Vycor" tube in which the reaction mixture is heated up to approximately 600° C. ("Vycor" is the name of a commercial product representative of a type of glass characterized by being refractory at high temperatures at which most glasses melt or soften.) The thus preheated reaction mixture is then passed through an externally heated "Vycor" reaction tube through which the reactants pass and are heated at about 900° C. for a period of time sufficient for about 42% of the benzene to be attacked. This occurred at a space velocity of 850 cc. of benzene vapors and hydrocyanic acid gas (calculated to STP) per hour per cubic centimeter of free space in the zone of the reactor in which the temperatures of about 900° C. were maintained.

The reaction products leaving the reactor are cooled to below the temperature at which benzene condenses therefrom. The benzonitrile also condenses and is washed out of the gases by the liquefied benzene. The benzonitrile may then be recovered separately from the benzene by distilling off the latter. Benzene and hydrocyanic acid gas recovered from the reaction products may be recycled to the reaction chamber, with the desired adjustment in the ratio of these materials introduced into the reactor.

In reacting benzene and hydrocyanic acid under the conditions of this example, a yield of about 40 mol percent benzonitrile, based on the benzene attacked, was obtained.

Example 2.—A mixture of about 4.7 mols hydrocyanic acid gas to 1 mol benzene was preheated and reacted at about 920° C. by the procedure of above Example 1. A space velocity of about 1180 cc. for passage of the reactants through the 920° C. reaction zone was maintained. Under these conditions about 23% of the benzene was attacked in passing through the reactor. From the reaction products, benzonitrile was recovered in about 53 mol percent yield based on the benzene attacked.

I claim:

1. The process for the production of benzonitrile which comprises heating a reaction mixture containing hydrocyanic acid gas and vapors of a compound from the group consisting of benzene and diphenyl at temperatures in the range 500° C. to 1100° C., at which temperatures the hydrocyanic acid and said compound react forming benzonitrile, said reaction mixture initially containing 1 to 10 mols hydrocyanic acid for every 1 mol benzene plus ½ to 5 mols hydrocyanic acid for every 1 mol diphenyl.

2. The process for the production of benzonitrile which comprises heating a reaction mixture containing hydrocyanic acid gas and vapors of a compound from the group consisting of benzene and diphenyl in the proportions of 1 to 10 mols hydrocyanic acid for every 1 mol benzene plus ½ to 5 mols hydrocyanic acid for every 1 mol diphenyl, said reaction mixture being heated at temperatures in the range 750° C. to 1100° C., whereby the hydrocyanic acid and said compound react forming benzonitrile.

3. The process for the production of benzonitrile which comprises heating at temperatures in the range 500° C to 1100° C. a mixture of benzene vapors and hydrocyanic acid gas in the proportions of 1 to 10 mols hydrocyanic acid for every 1 mol benzene, thereby reacting the benzene and hydrocyanic acid and forming benzonitrile therefrom.

4. The process for the production of benzonitrile which comprises heating at temperatures of about 750° C. to 1100° C. vapors of benzene mixed with 1.5 to 5 mols of hydrocyanic acid gas for every 1 mol of benzene and maintaining said benzene vapors and hydrocyanic acid gas at said temperature for a period of time such that about 10% to about 60% of the benzene is attacked, thereby forming benzonitrile.

5. The process for producing benzonitrile which comprises heating at temperatures in the range 500° C. to 1100° C. a reaction mixture initially containing hydrocyanic acid gas and vapors of at least one compound from the group consisting of benzene and diphenyl in amounts such that the mols hydrocyanic acid present in said reaction mixture are not substantially less than the total of the mols of benzene plus ½ the mols of diphenyl present therein.

6. The process for producing benzonitrile which comprises heating at temperatures in the range 500° to 1100° C. a reaction mixture initially containing gaseous hydrocyanic acid and benzene vapors in a mol ratio greater than 1 mol hydrocyanic acid to 1 mol benzene, said mixture being heated at said temperatures for a period of time such that about 10% to about 60% of the benzene is attacked, thereby forming benzonitrile.

JOHN N. COSBY.

REFERENCES CITED

The following references are of record in the file of this patent:

UNITED STATES PATENTS

| Number | Name | Date |
| --- | --- | --- |
| 1,584,137 | Poindexter | May 11, 1926 |
| 2,168,590 | Taylor | Aug. 8, 1939 |
| 2,331,968 | Forney | Oct. 19, 1943 |